United States Patent
Owada et al.

(10) Patent No.: US 9,934,593 B2
(45) Date of Patent: Apr. 3, 2018

(54) STATUS DETERMINATION SYSTEM

(71) Applicant: Biclick Co., Ltd., Tokyo (JP)

(72) Inventors: Masato Owada, Tokyo (JP); Kengo Tanaka, Tokyo (JP)

(73) Assignee: BICLICK CO., LTD., Tokyo (JP)

( * ) Notice: Subject to any disclaimer, the term of this patent is extended or adjusted under 35 U.S.C. 154(b) by 0 days.

(21) Appl. No.: 15/305,196

(22) PCT Filed: Dec. 28, 2015

(86) PCT No.: PCT/JP2015/086512
§ 371 (c)(1),
(2) Date: Oct. 19, 2016

(87) PCT Pub. No.: WO2016/121288
PCT Pub. Date: Aug. 4, 2016

(65) Prior Publication Data
US 2017/0046853 A1    Feb. 16, 2017

(30) Foreign Application Priority Data

Jan. 28, 2015  (JP) .................................. 2015-014475

(51) Int. Cl.
*G06Q 50/12* (2012.01)
*G06T 7/00* (2017.01)
*G06T 7/90* (2017.01)

(52) U.S. Cl.
CPC .............. *G06T 7/90* (2017.01); *G06Q 50/12* (2013.01); *G06T 7/00* (2013.01); *G06T 2207/10024* (2013.01)

(58) Field of Classification Search
CPC ......... G09G 2360/16; G09G 2360/145; G09G 2320/0257; G09G 2320/046;
(Continued)

(56) References Cited

U.S. PATENT DOCUMENTS 8,836,791 B2 * 9/2014 Hirano ...................... G06T 7/20
                                                           348/157
9,465,978 B2 * 10/2016 Hachisuka ......... G06K 9/00308
(Continued)

FOREIGN PATENT DOCUMENTS

JP      10-040292       2/1998
JP      2002-183720     6/2002
(Continued)

OTHER PUBLICATIONS

International Search Report, dated Apr. 12, 2016 (Apr. 12, 2016).
Korean Office Action dated Jan. 30, 2018, 9 pages.

*Primary Examiner* — Michael Osinski
(74) *Attorney, Agent, or Firm* — Rankin, Hill & Clark LLP

(57) ABSTRACT

Provided is a status determination system which can easily and reliably acquire status information on a monitor screen from the monitor screen. A status determination system 1 includes: image acquisition unit 10 which captures a screen of a monitor X via an adapter device W and acquires the screen as an image; image determination unit 20 which determines whether or not the image is an image from which status information is to be acquired; color information acquisition unit 30 which acquires color information at a specific point on the image when it is determined that the image is an image front which status information is to be acquired; and status conversion unit 40 which converts the acquired color information at the specific point to the status information.

5 Claims, 3 Drawing Sheets

(58) Field of Classification Search
CPC ............ G09G 2330/04; G09G 2330/12; G06T 2207/10024; G06T 2207/10016; G06T 2207/20076; G06T 7/408; G06T 7/136; G06T 7/194; G06T 7/90; G06K 9/78; H04N 21/23418; H04N 21/4316
See application file for complete search history.

(56) References Cited

U.S. PATENT DOCUMENTS

| | | | | |
|---|---|---|---|---|
| 9,761,161 | B2* | 9/2017 | Tseng | G09G 3/006 |
| 2003/0216972 | A1* | 11/2003 | Gotou | G01J 3/46 |
| | | | | 705/26.1 |
| 2008/0089572 | A1* | 4/2008 | Yamano | A61B 6/461 |
| | | | | 382/131 |
| 2010/0049664 | A1* | 2/2010 | Kuo | G06Q 40/00 |
| | | | | 705/36 R |
| 2012/0258436 | A1* | 10/2012 | Lee | G09B 19/00 |
| | | | | 434/362 |
| 2013/0170753 | A1* | 7/2013 | Tanaka | G06F 17/30256 |
| | | | | 382/190 |
| 2013/0339992 | A1* | 12/2013 | Oki | G06Q 30/0241 |
| | | | | 725/22 |
| 2014/0023264 | A1* | 1/2014 | Branch | G06K 9/78 |
| | | | | 382/141 |
| 2015/0026718 | A1* | 1/2015 | Seyller | H04N 21/4316 |
| | | | | 725/34 |
| 2015/0342511 | A1* | 12/2015 | Goldberg | G06Q 50/22 |
| | | | | 434/236 |
| 2016/0027353 | A1* | 1/2016 | Tseng | G09G 3/006 |
| | | | | 345/690 |
| 2017/0147897 | A1* | 5/2017 | Ueda | G06K 9/4652 |

FOREIGN PATENT DOCUMENTS

| | | |
|---|---|---|
| JP | 2003-150961 | 5/2003 |
| JP | 2008-218737 | 9/2008 |
| JP | 2009-294925 | 12/2009 |
| WO | 03/058554 | 7/2003 |

* cited by examiner

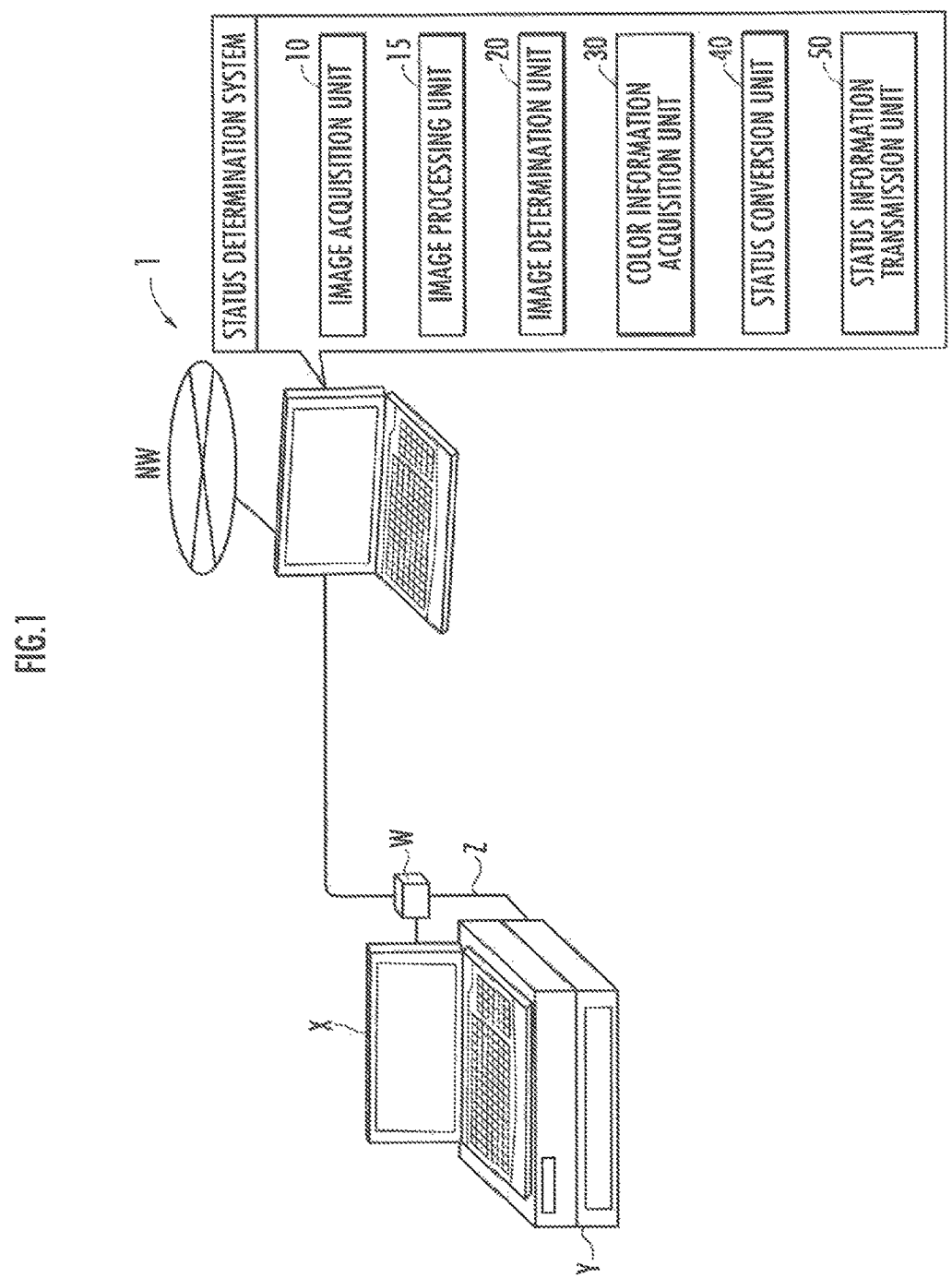

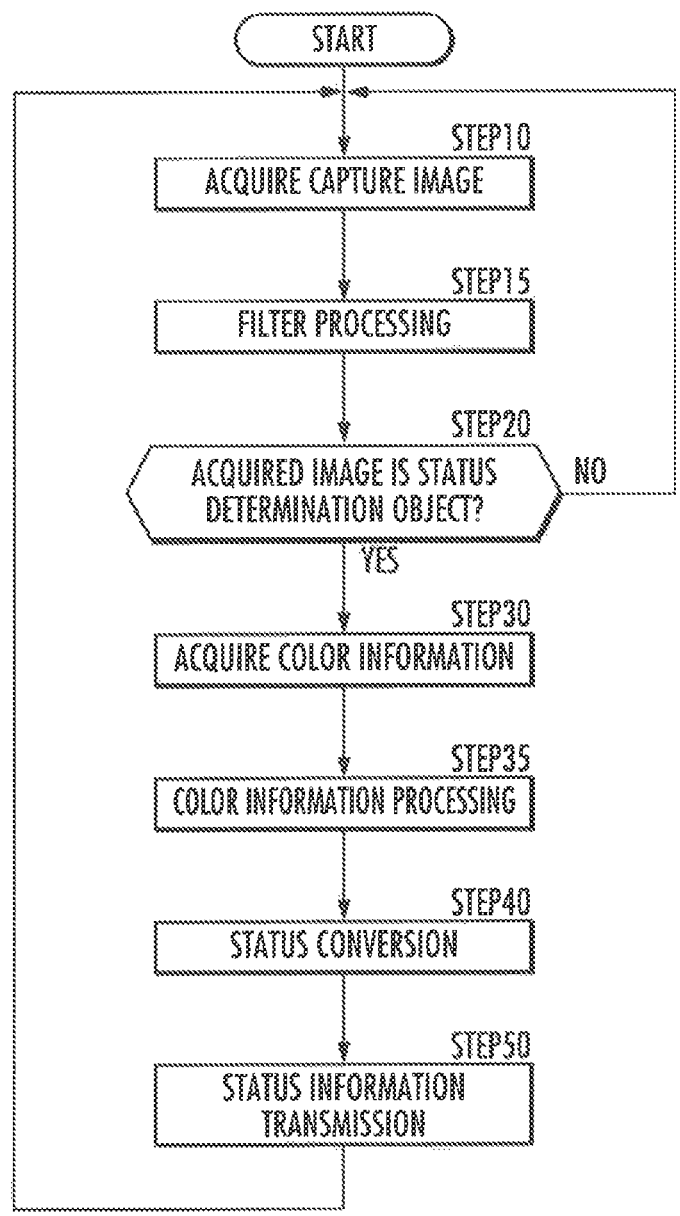

STATUS DETERMINATION SYSTEM

TECHNICAL FIELD

The present invention relates to a status determination system which acquires status information on a monitor screen.

BACKGROUND ART

Conventionally, as this type of status information system, as described in following Patent Literature 1, a front-desk operation processing apparatus is known, in which, in correspondence with identification information of each room in a lodging facility, a room state file storing information about utilization states of the room is provided, in which, based on the information stored in the room state file, the utilization states of vacant, occupied, reserved, and the like, of every room are determined, and in which the pieces of identification information of each room are listed on a color monitor screen, and also the regions inside the frames, each surrounding each of the pieces of identification information, are displayed on the color monitor screen by different colors.

CITATION LIST

Patent Literature

Patent Literature 1: Japanese Patent Laid-Open No. 10-40292

SUMMARY OF INVENTION

Technical Problem

Here, in the conventional status information system, the status information is already recognized in the status information system, and the status information is displayed on the monitor screen. For this reason, it is not necessary that specific information on the monitor screen is particularly acquired as status information, and then, the status state is determined.

However, there are also inform nation (for example, information on an analog screen formed by merely imaging a control panel) which is only displayed on the monitor screen and which is not recognized in the status information system, and information (for example, information which cannot be transmitted to other systems each having no interface) which is recognized in the system but cannot be transmitted to the other systems.

In view of the above, it is an object of the present invention to provide a status determination system which can easily and reliably acquire status information on a monitor screen from the monitor screen.

Solution to Problem

A status determination system according to a first aspect of the present invention is a status determination system which acquires status information on a monitor screen, and which is characterized by including:

an image acquisition unit which continuously captures the monitor screen and acquires the monitor screen as an image;
an image determination unit that determines whether or not the image acquired by the image acquisition unit is an image from which status information is to be acquired;
a color information acquisition unit which acquires color information at a specific point on the capture image when it is determined by the image determination unit that the capture image is an image from which status information is to be acquired; and
a status conversion unit which converts, to status information, the color information at the specific point, which color information is acquired by the color information acquisition unit, and
is characterized in that, when the color information at the specific point is the same between the continuously acquired images, the status conversion unit converts, to status information, the color information at the specific point, which color information is acquired by the color information acquisition unit.

According to the status determination system according to the first aspect of the present invention, the image acquisition unit captures and acquires the monitor screen as an image. Thereby, since all images, which can be displayed on the monitor screen, can be acquired, information which is only displayed on the monitor screen and is not recognized in the status determination system, and information which is recognized in the system but cannot be transmitted to other systems are acquired as images even when the meaning of the images is unknown at the time of acquisition).

Here, the acquired image may include various screens. For example, in addition to a screen which is subjected to the status determination, other operation screens, and the like, are displayed on the monitor screen. Therefore, the image determination unit can determine whether or not the acquired image is an image from which the status information is to be acquired, and thereby, specify the image which is to be subjected to the status determination.

Further, when the specified image is an image which is to be subjected to the status determination, the color information at the specific point of the acquired image (which point is the same as the specific point on the monitor screen) is acquired, and then, the color information is converted to status information, so that the status information can be easily and reliably acquired from the image displayed on the monitor screen.

In this way, according to the status determination system according to the first aspect of the present invention, the status information on the monitor screen can be easily and reliably acquired from the monitor screen.

The status determination system according to the second aspect of the present invention is configured such that, in the first aspect of the present invention, the image determination unit acquires color information at a specific exclusion point, which can be set at a coordinate position beforehand, is acquired from the image of the monitor screen acquired by the image acquisition unit, and then, based on the color information at the specific exclusion point, determines whether or not the image is an image from which status information is to be acquired.

According to the status determination system according to the second aspect of the present invention, the image determination unit is configured to be able to set beforehand the characteristic specific exclusion point on an image, for example, other operation screen, and the like, displayed on the monitor screen, and to thereby acquire the color information of the specific exclusion point. Further, based on the color information at the specific exclusion point, the image determination unit determines whether or not the image on the monitor screen is an image from which status information is to be acquired, as a result of which the image determination unit can easily and reliably specific the image which is to be subjected to the status determination.

In this way, according to the status determination system according to the second aspect of the present invention, it is possible to simply and reliably determine whether or not the image on the monitor screen is an image from which status information is to be acquired, and thereby, the status information on the monitor can be simply and reliably acquired from the monitor screen.

The status determination system according to the third aspect of the present invention is configured such that, in one of the first and second aspects of the present invention, the color information acquisition unit is able to set the specific point as a coordinate position beforehand, and to acquire specific color information at the coordinate position, and peripheral color information at the peripheral coordinates surrounding the coordinate position, and based on the specific color information and the peripheral color information, the status conversion unit performs conversion to the status information.

According to the status determination system according to the third aspect of the present invention, not only the specific color information at the coordinate position of the specific point set beforehand, but also the peripheral color information at the peripheral coordinates surrounding the coordinate position are acquired, and the conversion to the status information is performed based on the specific color information and the peripheral color information, as a result of which, even when a color blur is caused on, for example, an analog screen, or the like, the conversion to the status information can be reliably performed by complementing the peripheral color information.

In this way, according to the status determination system according to the third aspect of the present invention, the conversion of the monitor screen to the status information can be reliably performed, and thereby, the status information on the monitor screen can be easily and reliably acquired from the monitor screen.

The status determination system according to the fourth aspect of the present invention is configured, in the first aspect of the present invention, to include an image processing unit which performs filter processing so that the image on the monitor screen, the image being acquired by the image acquisition unit, is converted to a image having a fixed number of colors, and which then acquires color information at each of the specific point settable as the coordinate position beforehand and specific exclusion point settable beforehand and peripheral color information at peripheral coordinates surrounding each of the coordinate position of the specific point and the coordinate position of the specific exclusion point, and thereby determines colors at the specific point and the specific exclusion points based on the color information and the peripheral color information, and is configured such that, based on the colors of the specific exclusion points, which colors are determined by the image processing unit, the image determination unit determines whether or not the image is an image from which status information is to be acquired, and such that the status conversion unit performs the conversion to status information based on the color of the specific point, which color is determined by the image processing unit.

According to the status determination system of the fourth aspect of the present invention, the image processing unit (1) performs filter processing beforehand so that the image on the monitor screen, which image is acquired by the image acquisition unit, is converted to a image having the fixed number of colors, (2) acquires color information at each of the specific point settable as the coordinate position beforehand and specific exclusion point settable beforehand and peripheral color information at peripheral coordinates surrounding each of the coordinate position of the specific point and the coordinate position of the specific exclusion point. Thereby, the colors at the specific point and the specific exclusion points can be acquired based on the color information and the peripheral color information. As a result, while the improvement in the processing efficiency can be improved by the collective processing, the accuracy of the image determination processing by the image determination unit, and the accuracy of the status conversion processing by the status conversion unit can be improved.

In this way, according to the status determination system of the fourth aspect of the present invention, the status information on the monitor screen can be obtained easily and reliably from the monitor screen with high efficiency and high accuracy.

BRIEF DESCRIPTION OF DRAWINGS

FIG. 1 is a system configuration diagram schematically showing a status determination system according to a present embodiment.

FIG. 2 is a flowchart showing processing contents in the status determination system of FIG. 1.

DESCRIPTION OF EMBODIMENTS

Figure 3A:
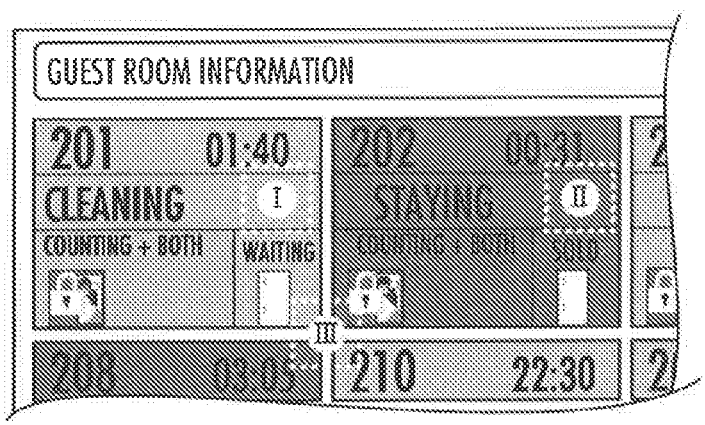
FIG. 3A and FIG. 3B illustrate the processing contents in the status determination system of FIG. 1.

As shown in FIG. 1, a status determination system 1 of a present embodiment is a system configured to acquire status information on a screen of a monitor X, and includes an image acquisition unit 10, an image processing unit 15, an image determination unit 20, a color information acquisition unit 30, a status conversion unit 40, and a status information transmission unit 50.

The screen of the monitor X is a determination object and is, for example, a screen of a front computer Y in a lodging facility. Further, for example, "occupied", "vacant", "cleaning", "reserved", and the like, are displayed in different colors in regions on a screen of the front computer Y, which are partitioned for each room (see FIG. 3).

The image acquisition unit 10 captures and acquires a screen on the monitor X via an adapter device W. The adapter device W periodically performs sampling of an analog image signal of a monitor cable (VGA cable) Z connecting the front computer Y to the monitor X, and outputs obtained image data to the status determination system 1.

The adapter device W is, for example, a VGA video capture board, and may also have a function as a VGA distribution cable conjugated with the video capture board. Further, the adapter device W is not limited to the VGA video capture board conjugated with the VGA cable, and may be a video capture board used to capture video from a video (S-Video method or composite method) input/output cable, a DVI capture board for digital display, a SDI capture board for a business-use video or a security camera, a HDMI (registered trademark) capture board of a general video device, or the like.

The image processing unit 15 performs filter processing of capture images n practice, capture images outputted at each predetermined cycle) acquired via the adapter device W.

The filter processing is, for example, RGBA conversion which converts a capture image into an image having a specific number of colors. It should be noted that, other than the RGBA conversion, the filter processing may be PNG conversion, and the like, in which the number of colors is smaller than in the RGBA conversion.

The image determination unit 20 determines whether or not the capture image subjected to the filter processing by the image processing unit 15 is a screen from which status information is to be acquired.

Specifically, based on color information at a specific exclusion point on the capture image subjected to the filter processing, the image determination unit 20 determines whether or not the capture image is an image from which status information is to be acquired.

It should be noted that the specific exclusion point can be set beforehand as a coordinates position (X, Y) on the image, and the image determination unit 20 acquires the color information (RGB data) at the coordinate position. Then, when the color information (RGB data) is an exclusion color (RGB component in a specific range), the image determination unit 20 determines that the capture image is not an image from which the status information is to be acquired.

When it is determined by the image determination unit 20 that the capture image is an image from which status information is to be acquired, the color information acquisition unit 30 acquires the color information at the specific point of the capture image.

It should be noted that the method, in which the color information at the specific point (on the capture image is acquired by the color information acquisition unit 30, will be discussed in more detail below.

By using a conversion table, or the like, the status conversion unit 40 performs processing so that the color information (RGB data) at the specific point, which color information is acquired by the color information acquisition unit 30, is converted to status information "occupied", "vacant", "cleaning", "reserved", and the like).

It should be noted that the conversion of the color data to the status information performed by the status conversion unit 40 may also be the conversion to the code in formation of the status.

The status information transmission unit 50 transmits the status information ("occupied", "vacant", "cleaning", "reserved", and the like) formed by the conversion by the status conversion unit 40, to an external server, or the like, via a network NW, such as the Internet.

In the above configuration, the status determination system 1 is configured by hardware, for example, CPU (Central Processing Unit), ROM (Read Only memory), RAM (Random Access Memory), and the like. The status determination system 1 stores and retains, in a memory (not shown), a program, according to which the above-described processing unit 10 to 50 performs the processing, and also has a function as a calculation device (sequencer) which performs the above-described control processing by executing the program.

Next, a processing method for acquiring the status information in the status determination system 1 configured as described above will be described with reference to FIG. 2.

First, in the status determination system 1, the image acquisition unit 10 acquires, via the adapter device W, a screen on the monitor X as a capture image (in practice, consecutive images captured in a constant cycle) (STEP 10 in FIG. 2).

Next, in the status determination system 1, the image processing unit 15 performs the filter processing to the capture image acquired in STEP 10 and converts the processed capture image to RGB data having specific color numbers (STEP 15 in FIG. 2).

Then, in the status determination system 1, the image determination unit 20 determines whether or not the capture image (more precisely, one frame image of continuous capture images), which is subjected to the filter processing (is converted to the RGBA data) in STEP 15, is a screen from which status information is to be acquired (STEP 20 in FIG. 2).

Figure 3B:
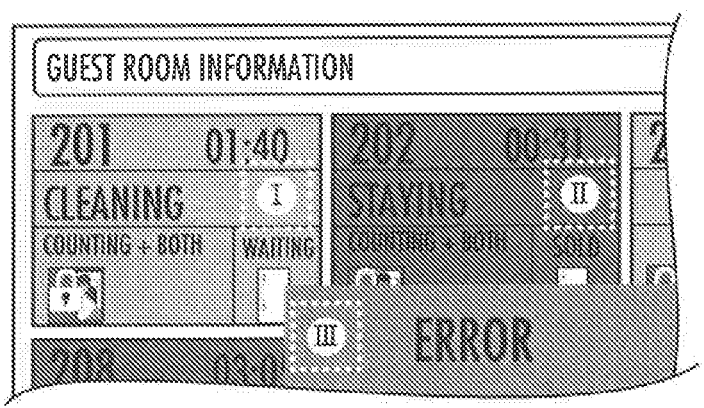

Specifically, the image determination unit 20 acquires color information at a specific exclusion point (III) shown in FIG. 3A and FIG. 3B, and determines whether or not the acquired color information (RGB data) is an exclusion color (RGB component in the specific range). When the acquired color information (RGB data) is not the exclusion color (RGB component in the specific range), the image determination unit 20 determines that the capture image is a screen from which status information is to be acquired (YES in STEP 20 in FIG. 2).

For example, in the case of FIG. 3A, in the color information at the specific exclusion point (III), there is no exclusion color characteristic to other operation screens, and the like, and hence, the image determination unit 20 determines that the capture image is a screen from which status information is to be acquired.

On the other hand, when the color information (RGB data) at the specific exclusion point (III) is the exclusion color (RGB component in the specific range), the image determination unit 20 determines that the capture image is not an image from which status information is to be acquired (NO in STEP 20 in FIG. 2).

For example, in the case of FIG. 3B, the color information of the specific exclusion point MD includes the exclusion color characteristic to other operation screens, and the like, and hence, the image determination unit 20 determines that the capture image is not an image from which status information is to be acquired.

In this way, based on the color information at the specific exclusion point, it is possible to determine whether or not the image on the monitor screen is an image from which status information is to be acquired, as a result of which the image, to which the status determination is to be performed, can be easily and reliably specified.

It should be noted that the specific exclusion point can be set as a coordinate position (X, Y) on the image beforehand, and the specific exclusion point may be a point. However, in order to improve the determination accuracy, it is preferred that a plurality of the specific exclusion points are set, and that, based on the color information at the plurality of specific exclusion points, an image, from which status information is to be acquired, is determined.

Thereby, for example, when the exclusion color is included in a portion of the color information at the plurality of specific points on the image, it can be determined that the image is not an image from which status information is to be acquired. Thereby, also in the case where other operation screens are superimposingly displayed on apart of the image, the image can be reliably excluded.

Next, if it is determined by the image determination unit 20 that the capture image is a screen from which status information is to be acquired (YES in STEP 20 in FIG. 2), the color information acquisition unit 30 acquires the color information at the specific point on the capture image (STEP 30 in FIG. 2). For example, in the case of FIG. 3A, the color information acquisition unit 30 acquires the color information at the specific points (I) and (II).

On the other hand, if it is determined by the image determination unit 20 that the capture image is not a screen from which status information is to be acquired (NO in STEP 20 in FIG. 2), the process returns to STEP 10.

Here, in addition to color information (RGB data) of the pixel at the coordinate position (X, Y) on each of the images which are respectively set beforehand at the specific points (I) and (II) corresponding to Room 201 and Room 202, the color information acquisition unit 30 acquires color information (RGB data) of the pixels around the coordinate position (X. Y).

For example, in addition to the color information at the coordinate position (Xn, Yn) of the specific point, the color information acquisition unit 30 acquires color information (RGB data) of eight pixels at (Xn−1, Yn−1), (Xn, Yn−1), (Xn-f-1, Yn−1), (Xn−1, Yn), (Xn+1, Yn), (Xn−1, Yn+1), (Xn, Yn+1), (Xn+1, Yn+1), around the coordinate position (Xn, Yn).

Next, the color information acquisition unit 30 performs color information processing of the acquired color information (RGB data) at the specific point and at the coordinate positions around the specific point (STEP 35 in FIG. 2).

In the color information processing here, the color (RGB) at the specific point is comprehensively determined from the acquired color information (RGB data) at the specific point and at the coordinate positions around the specific point.

For example, in STEP 30, when, in addition to the color information at the coordinate position (Xn, Yn) of the specific point, peripheral color information (RGB data) of pixels at eight points of (Xn−1, Yn−1), (Xn, Yn−1), Yn−1), (Xn−1, Yn), (Xn+1, Yn), (Xn−1, Yn+1), (Xn, Yn+1), (Xn+1, Yn+1) which surround the coordinate position (Xn, Yn) of the specific point is acquired, the mean color (RGB) of the color information (RGB data) at the nine points is calculated in the color information processing.

In this way, not only the specific color information at the coordinate position of the specific point set beforehand, but also the peripheral color information at the peripheral coordinates surrounding the coordinate position of the specific point are acquired, and then, based on the specific color information and the peripheral color information, the conversion to the next status information is performed. For example, even when a color blur is caused on an analog screen, or the like, the conversion to the status information can be reliably performed by complementation by the peripheral color information.

Next, the status conversion unit 40 performs processing so that the color information (RGB data) at the specific point, which information is subjected to the color information process in STEP 35, is converted to the status information ("occupied", "vacant", "cleaning", "reserved", and the like) (STEP 40 in FIG. 2).

Specifically, the conversion of the color information RGB data) to the status information is performed by using a conversion table.

For example, according to the color information (RGB data), the conversion table is set to have a relationship such that "occupied" is designated by red, and "rest" is designated by yellow, such that "vacant" is designated by blue, and "cleaning" is designated by green, and such that "wait for cleaning" is designated by light-blue, and "guidance and accounting" is designated by pink.

Further, as described above, the conversion table may be a single stage table, but may be a two-stage table in which the status after conversion is again converted. For example, when the two-stage table is used, the relationship between the types of the status is set such that, in the case of "lodging" and "rest", the both are set to correspond to "occupied", and such that, in the case of "cleaning" and "wait for cleaning", the both are set to correspond to "cleaning".

Thereby, the types of the status can be reduced, and hence, when external transmission is performed, the types of the status can be limited.

For example, in the case of FIG. 3A, the specific point (I) corresponding to the room 201 (the green region on the image) is converted to "cleaning" or code information of "cleaning" as the status information corresponding to the specific point (I) by the conversion table described above. Similarly, the specific point (II) corresponding to the room 202 (the red region on the image) is converted to "occupied" or code information of "occupied" as the status information corresponding to the specific point (II).

It should be noted that the status conversion unit 40 may convert the capture image (precisely, one frame image of continuous capture images) to the status information. However, since the status information is generated repeatedly in a frame period, and hence, it is preferred that, only when, in the continuous capture images (for example, ten frames), the specific points (I) and (II) are the same between the frames, the conversion processing is performed.

Further, in the present embodiment, the capture image is converted to the status information in correspondence with the conversion table based on the specific colors (red, yellow, blue, . . . ). However, the present invention is not limited to this, and comparison inspection method based on the difference between color values may also be applied.

In this case, the threshold value for color variation components (255 steps) is set as A. and the RGB components of the determination table are respectively set as RC, GC, BC, and the acquired RGB values are respectively set as R, G, B.

Then, the following six conditions are confirmed.

$(R+A)<RC$ $(R-A)>RC$ $(G+A)<GC$ $(G-A)>GC$ $(B+A)<BC$ $(B-A)>BC$

Then, when all of the six conditions are truth, it is determined that the acquired RGB values coincide with the RGB values of the determination table, and then, the conversion is performed. Thereby, the determination is performed only by the logical operation, and hence, the processing speed can be increased.

Finally, the status information transmission unit 50 performs processing so that, in association with the specific points (Room 201, Room 202), the status information ("occupied", "vacant", "cleaning", "reserved", and the like) resulted from the conversion in STEP 40, or the code information corresponding to the status information is transmitted to an external server, or the like, via the network NW, such as the Internet (STEP 50 in FIG. 2), and then, the status information transmission unit 50 returns to STEP 10.

In the above, the acquisition processing method of status information in the status determination system 1 is described in detail. According to the status determination system 1, the status information on the screen of the monitor X can be acquired easily and reliably from the screen.

It should be noted that, in the present embodiment, the screen of the front computer Y in the lodging facility is described as an example of the screen of the monitor X, which screen is the determination object, but the present invention is not limited to this.

For example, the present invention can be applied to a monitor screen in each of various control systems, a camera-captured image obtained by capturing parking sections of a parking place or seats in a hole, and the like.

Further, in the present embodiment, the case is described, in which the color information processing is performed for the color information (RGB data) at the specific point and the portions around the specific point in STEP 35. However, the present invention is not limited to this, and the color information processing may also be performed in such a manner that, in the image processing unit 15, (1) the capture image is subjected to the filter processing in STEP 15, and (2) (i) the color information at the specific point and the portions around the specific point is added to the image subjected to the filter processing, and (ii) the color information at the specific exclusion point and the portions around the specific exclusion points are acquired beforehand, and such that the color information process is performed to the color information (i) and (ii).

In this case, the color information process in STEP 35 is performed in conjunction with the filter processing by the image processing unit 15, and thereby, the processing efficiency can be improved. Also, it is possible to improve the accuracy of determination made, in STEP 20, as to whether or not the image at the specific exclusion point is a screen from which status information is to be acquired.

REFERENCE SIGNS LIST

1 Status determination system
10 Image acquisition unit
20 Image determination unit
30 Color information acquisition unit
40 Status conversion unit
50 Status information transmission unit
X Monitor screen
Y Front computer
Z Monitor cable
W Adapter device
NW Network

The invention claimed is:

1. A status determination system which acquires status information on a monitor screen, the status determination system comprising:
   an image acquisition unit which continuously captures the monitor screen and acquires the monitor screen as an image;
   an image determination unit which determines whether or not the image acquired by the image acquisition unit is an image from which status information is to be acquired;
   a color information acquisition unit which acquires color information at a specific point on the image when it is determined by the image determination unit that the image is an image from which status information is to be acquired; and
   a status conversion unit which converts, to status information, the color information at the specific point on the image, the color information being acquired by the color information acquisition unit,
   wherein, when the color information at the specific point on the image is the same between continuously acquired images, the status conversion unit converts, to status information, the color information at the specific point on the image whose color information is acquired by the color information acquisition unit.

2. The status determination system according to claim 1, wherein
   the image determination unit acquires color information at a specific exclusion point on the image which can be set as a coordinate position beforehand, from the image of the monitor screen acquired by the image acquisition unit, and then, based on the color information at the specific exclusion point, determines whether or not the image is an image from which status information is to be acquired.

3. The status determination system according to claim 1, wherein
   the color information acquisition unit is able to set the specific point on the image as a coordinate position beforehand, and to acquire the specific color information at the coordinate position, and peripheral color information at the peripheral coordinates surrounding the coordinate position, and
   based on the specific color information and the peripheral color information, the status conversion unit performs conversion to the status information.

4. The status determination system according to claim 1, comprising
   an image processing unit which performs filter processing to the image on the monitor screen acquired by the image acquisition unit, to thereby convert the image to an image having a fixed number of colors, and then acquires color information at each of a plurality of specific points on the image settable as coordinate positions beforehand and at specific exclusion points on the image settable beforehand and peripheral color information at peripheral coordinates surrounding each of the coordinate positions of each of the plurality of specific, points and the coordinate positions of the specific exclusion points,
   wherein, based on the colors of the specific exclusion points whose colors are determined by the image processing unit, the image determination unit determines whether or not the image is an image from which status information is to be acquired, and
   the status conversion unit performs the conversion to the status information based on the colors of each of the plurality of specific points whose colors are determined by the image processing unit.

5. The status determination system according to claim 2, wherein
   the color information acquisition unit is able to set the specific point on the image as a coordinate position beforehand, and to acquire the specific color information at the coordinate position, and peripheral color information at the peripheral coordinates surrounding the coordinate position, and
   based on the specific color information and the peripheral color information, the status conversion unit performs conversion to the status information.

* * * * *